Sept. 13, 1927.

M. K. HOLMES 1,642,658

GLASS WORKING MACHINE

Filed Dec. 1, 1924

INVENTOR
Minot K. Holmes,
BY
Hood & Hahn.
ATTORNEYS

Sept. 13, 1927.  
M. K. HOLMES  
GLASS WORKING MACHINE  
Filed Dec. 1, 1924

INVENTOR  
*Minot K. Holmes,*  
BY  
*Hood & Hahn.*  
ATTORNEYS

Sept. 13, 1927.  
M. K. HOLMES  
1,642,658  
GLASS WORKING MACHINE  
Filed Dec. 1, 1924     13 Sheets-Sheet 6

INVENTOR  
Minot K. Holmes,  
BY  
Hood & Hahn  
ATTORNEYS

Sept. 13, 1927. 1,642,658
M. K. HOLMES
GLASS WORKING MACHINE
Filed Dec. 1, 1924 13 Sheets-Sheet 7

INVENTOR
Minot K. Holmes,
BY
Hood & Hahn
ATTORNEYS

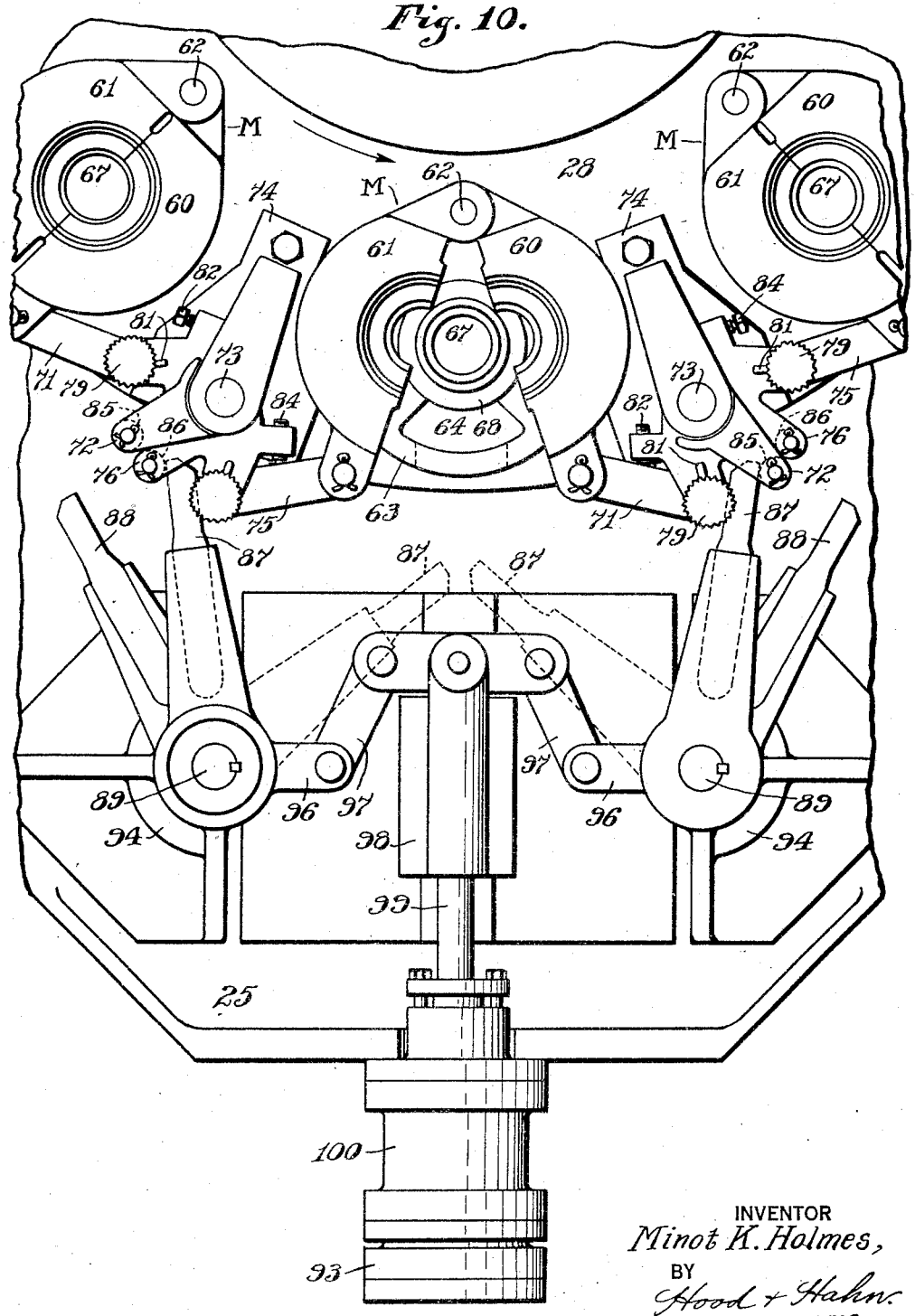

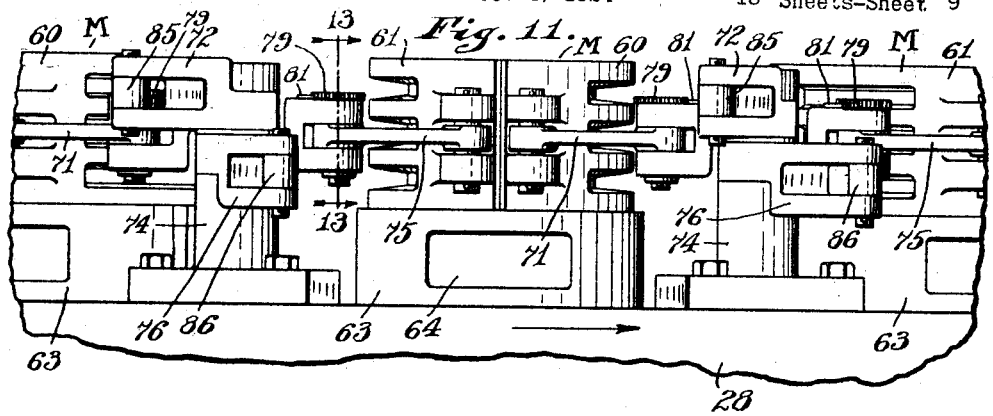
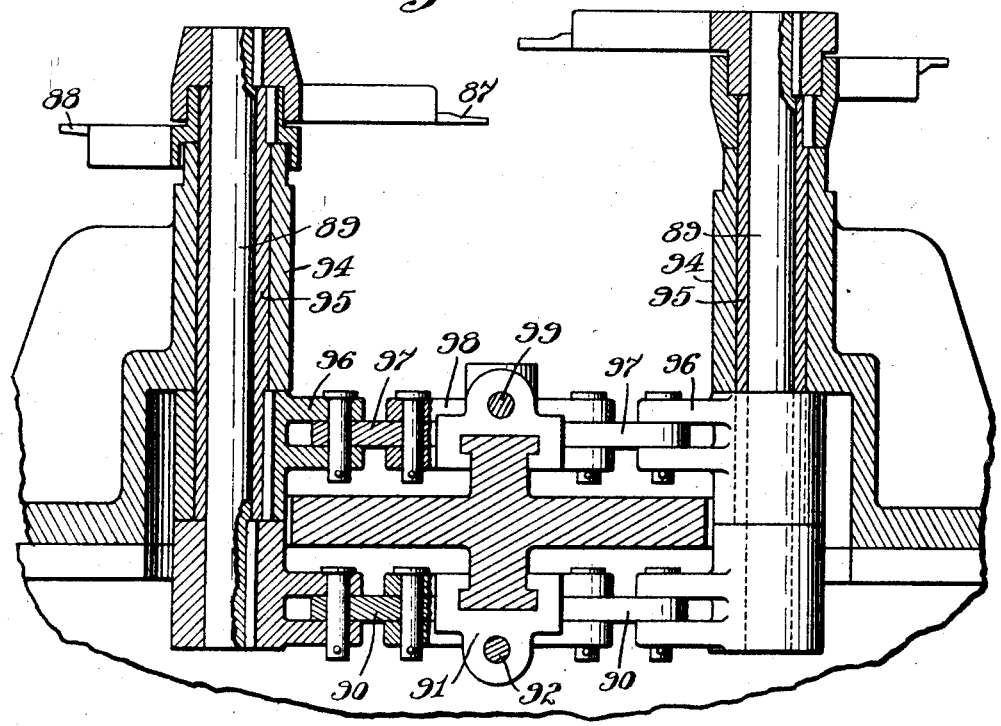
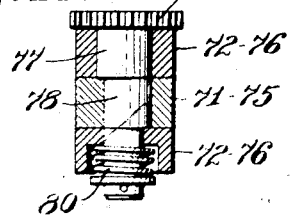

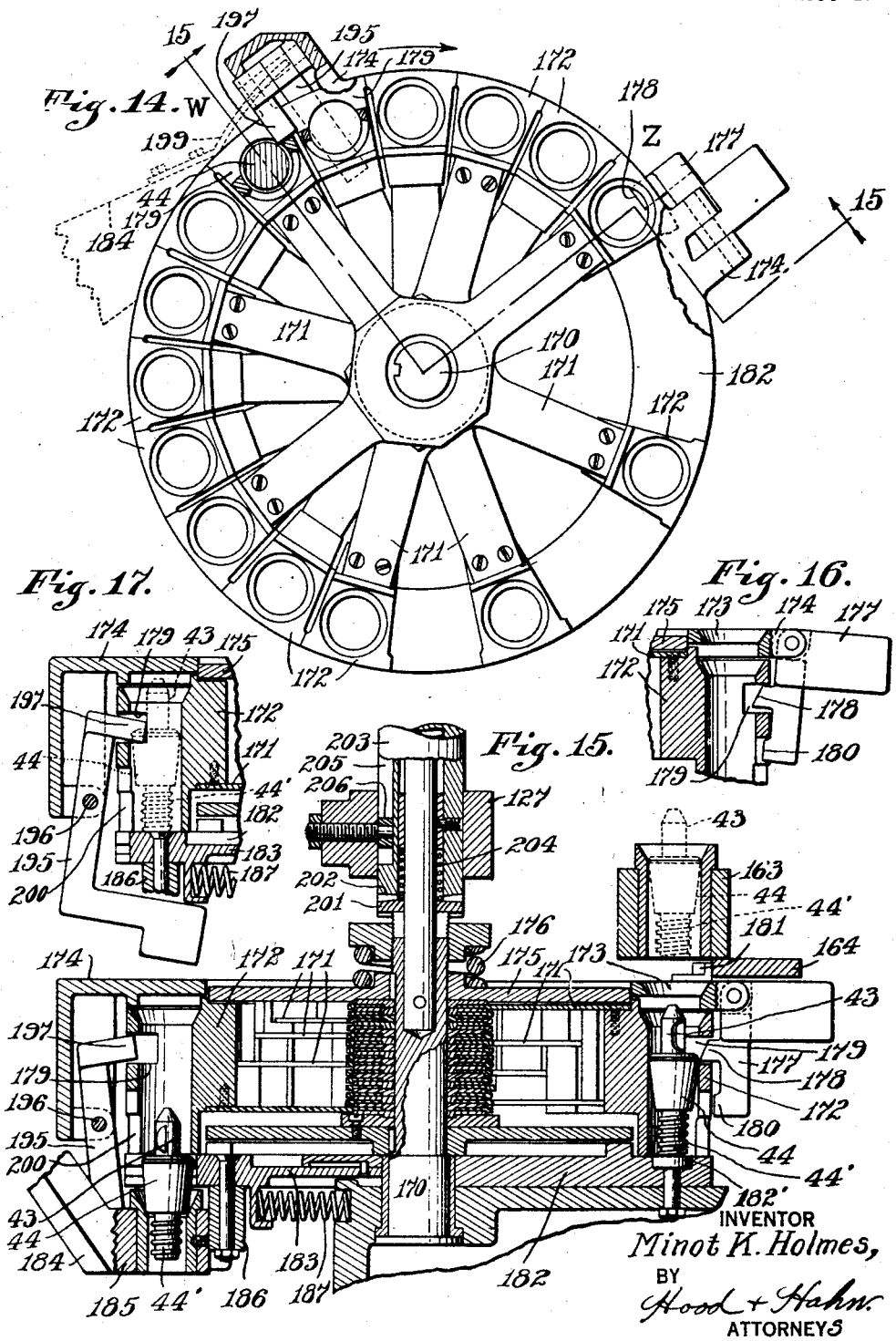

Sept. 13, 1927.
M. K. HOLMES
1,642,658
GLASS WORKING MACHINE
Filed Dec. 1, 1924   13 Sheets-Sheet 11
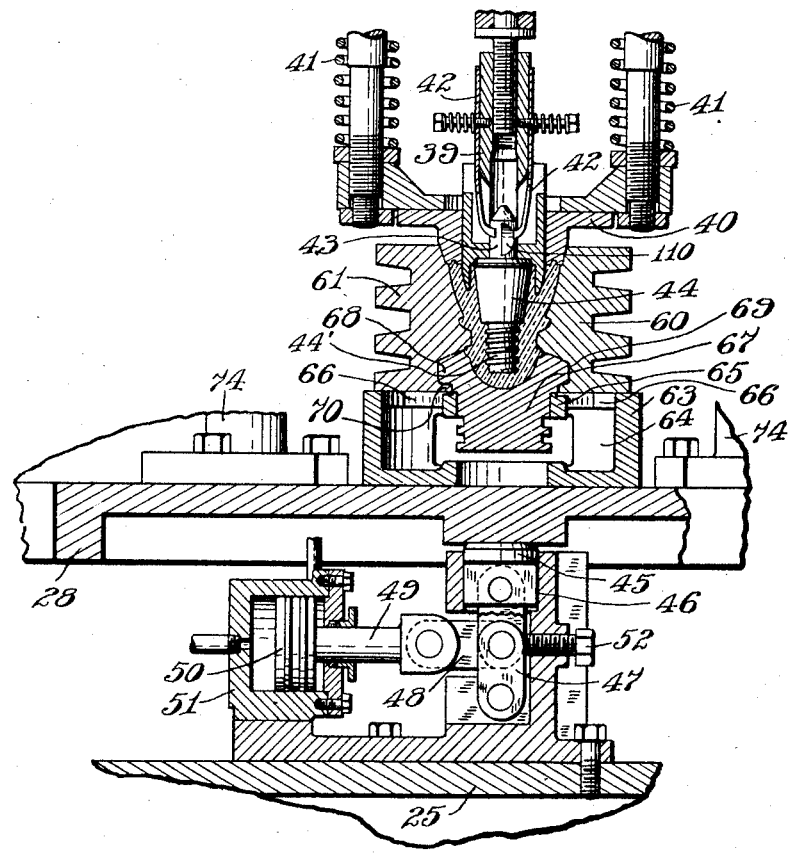
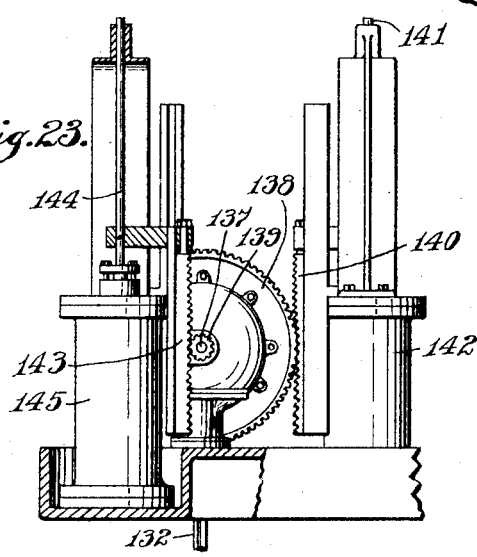
INVENTOR
Minot K. Holmes,
BY
Hood + Hahn
ATTORNEYS Sept. 13, 1927.
M. K. HOLMES
1,642,658
GLASS WORKING MACHINE
Filed Dec. 1, 1924     13 Sheets-Sheet 12
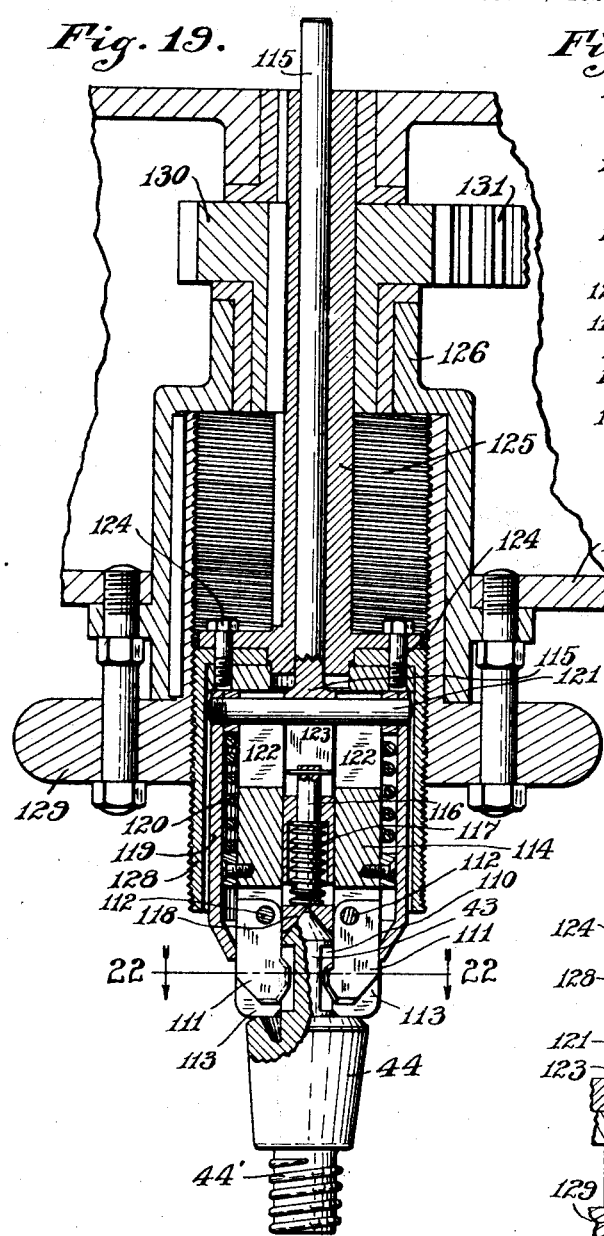
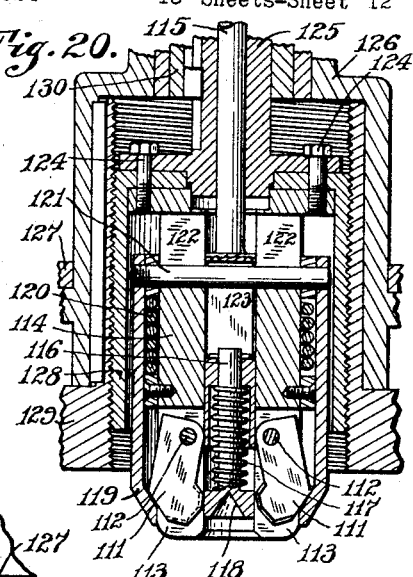
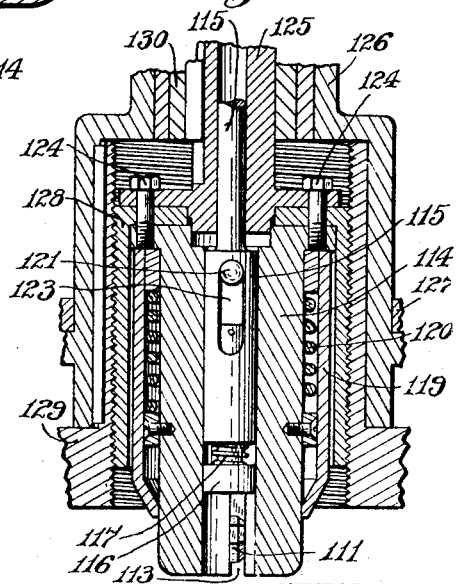
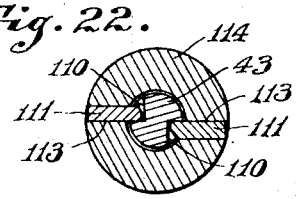
INVENTOR
Minot K. Holmes,
BY Hood + Hahn
ATTORNEYS

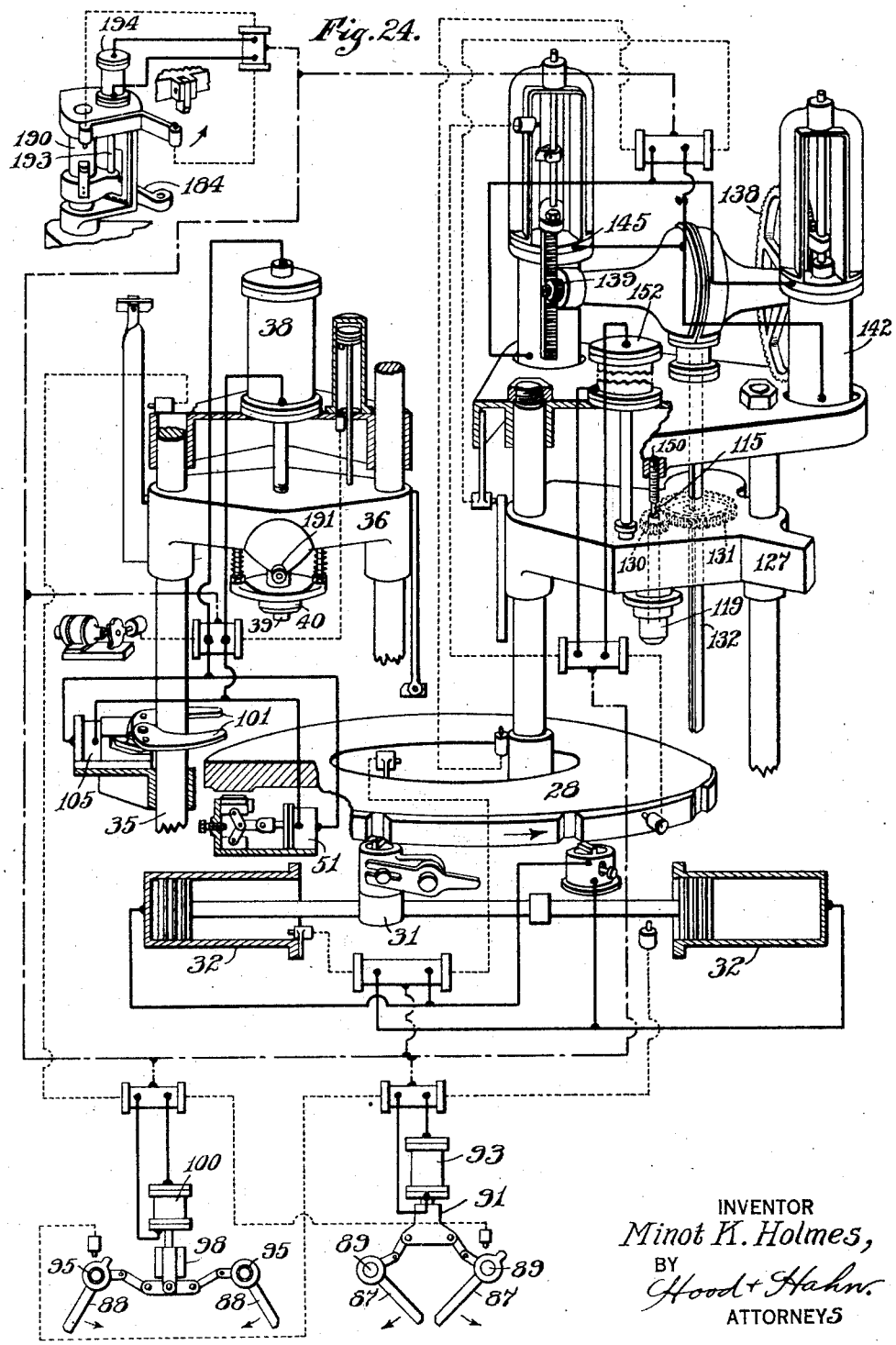

Patented Sept. 13, 1927.

1,642,658

UNITED STATES PATENT OFFICE.

MINOT K. HOLMES, OF MUNCIE, INDIANA, ASSIGNOR TO HEMINGRAY GLASS COMPANY, OF MUNCIE, INDIANA, A CORPORATION OF KENTUCKY.

GLASSWORKING MACHINE.

Application filed December 1, 1924. Serial No. 753,220.

The object of my invention is to produce an automatic glass working machine primarily designed for the production of pressed glassware of such form that a portion of the forming mechanism must be screwed out of the formed article, the machine having been particularly designed for the production of internally threaded glass electric insulators.

The accompanying drawings illustrate my invention.

Fig. 10 is a view similar to Fig. 9 with the molds open;

Fig. 11 is a side elevation of one of the molds, and the mold operating mechanism, with the mold closed;

Fig. 12 is a vertical section on line 12—12 of Fig. 9;

Fig. 13 is a fragmentary section, on an enlarged scale, on line 13—13 of Fig. 11;

Fig. 14 is a plan of the pin transfer basket;

Fig. 15 is a vertical section on line 15—15 of Fig. 14;

Fig. 16 is a fragmentary section on the right hand end of section line 15—15 of Fig. 14, with the catch in arm restraining position;

Fig. 17 is a fragmentary section on the left hand end of line 15—15 of Fig. 14, with the latch in basket-arm restraining position;

Fig. 18 is a vertical section, on the scale of Figs. 9 and 10, of a mold and associated parts in the press position;

Fig. 19 is a vertical section, approximately one half size, of the screw-out chuck, parts being shown in initial pin clutching position;

Fig. 20 is a fragmentary section of the clutch in pin ejecting position;

Fig. 21 is a section at right angles to the plane of Fig. 20;

Fig. 22 is a section on line 22—22 of Fig. 19;

Fig. 23 is an elevation, in partial vertical section, on line 23—23 of Fig. 3;

Fig. 24 is a connection diagram.

Figure 1:
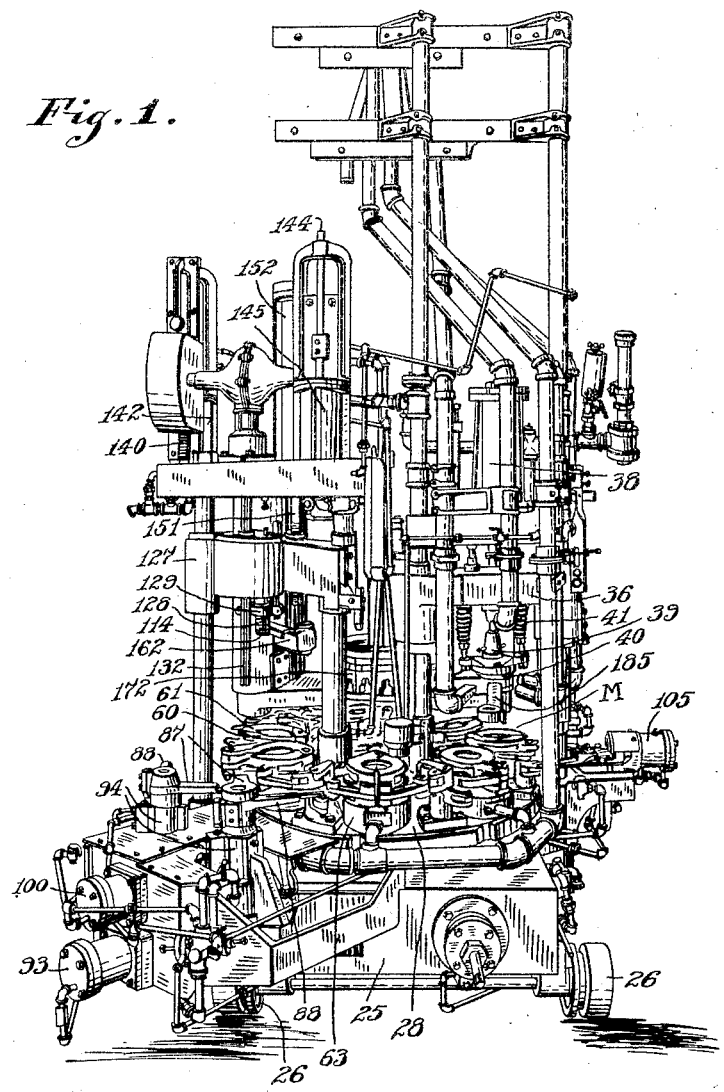
Fig. 1 is a perspective view of the complete machine.
Figure 2:
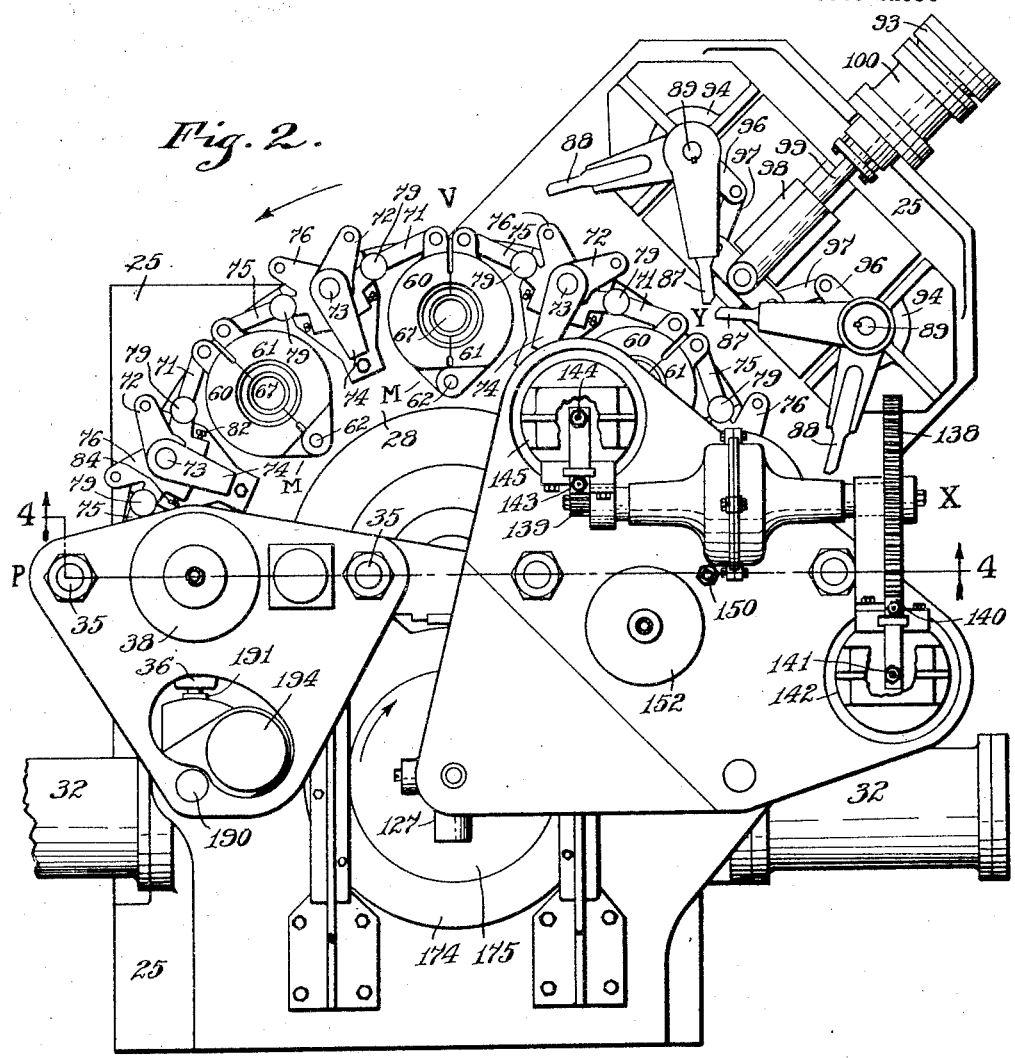
Fig. 2 is a plan.
Figure 3:
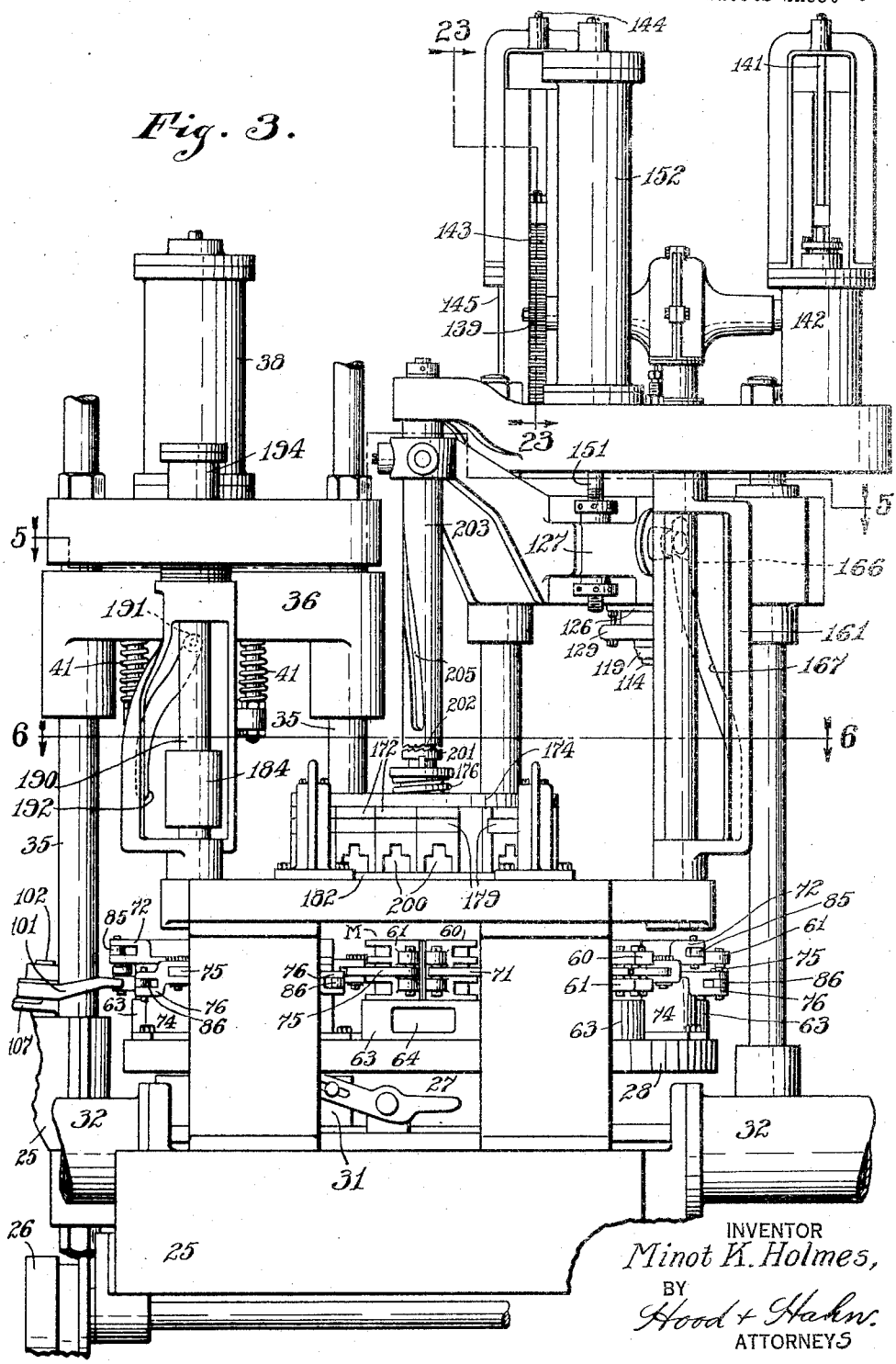
Fig. 3 is a rear elevation.

In the drawings 25 indicates a suitable base structure of common form supported by trucks 26 so that the machine may be readily shifted into and out of operating position. Journaled on a support 27 carried by base 25 is a mold table 28, ball bearings 29 being provided to support the weight of table 28, and parts carried thereby, and roller bearings 30 being vertically arranged between table 28 and support 27, the arrangement being such that table 28 is free to be lifted from bearings 29 without diminishing the supporting effect of the vertically placed roller bearings 30.

The table 28 carries a plurality of circumferentially spaced molds M, details of which will be described later, and table 28 is intermittently advanced, step by step, by means of table driving mechanism 31 operated by pneumatic cylinders 32, 32. The table advancing mechanism may be of any desired and well known type and forms no part of my present invention and is therefore not described in detail.

Rising from the base 25 at the press position are two parallel guide rods 35, 35 (Fig. 4) upon which is vertically slidable a cross head 36 operated by means of a piston 37 in a pneumatic cylinder 38. Cross head 36 carries a pin chuck 39, the details of which form no part of my present invention and which are of common and well known form illustrated more particularly in Fig. 18 and comprising a mold cover 40 yieldingly backed by springs 41, 41 and pin-retaining spring fingers 42, 42 between which the shank 43 of the press pin 44 may be retained.

Parts 36—42 will be hereafter conveniently referred to as the press plunger, arranged in vertical alignment above the press position assumed by the molds successively during advancement of the table.

Vertically beneath the press plunger under the table is an anvil 45 supported in a vertical guide 46 by a toggle 47 the middle of which is connected by a link 48 with piston rod 49 of the piston 50 mounted in pneumatic cylinder 51, a temper screw 52 being provided to limit the throw of toggle 47 in one direction and the arrangement being such that, immediately preceding a pressing action of the press plunger, anvil 45 will be raised into engagement with table 28 so as to firmly support the table under the high pressures exerted by the press plunger, the adjustment of temper screw 52 being preferably such that table 28 will be lifted slightly from ball bearings 29 (roller bearings 30 permitting this movement) so that the ball bearings 29 will be freed from pressure during the pressing operations.

The molds M are formed in two halves 60, 61 (Figs. 9 and 10) pivotally supported upon pin 62 carried by table 28. The sections 60 and 61 surmount a base 63 (Fig. 18) which is chambered into as large a chamber 64 as possible, the chamber 64 being open through the side walls of base 63. The base 63 comprises a central ring 65 supported by circumferentially separated radial fingers 66, the ring 65 forming a support for the mold bottom 67 which is flanged at its upper end, as shown at 68, so as to be received in a groove 69 formed in the mold sections 60 and 61, the groove 69 being formed in part by the projecting flange 70 which underlies flange 68 of mold bottom 67 so that the pressing pressures exerted upon the mold bottom 67 are carried by flanges 70 and the mold sections instead of by ring 65.

The large chamber 64, open at its sides, provides drainage space for any surplus glass which may pass readily down through between the radial fingers 66 and from this large chamber 64 the congealed glass may be readily blown during the further movements of the table.

Mold section 60 is connected by a link 71 (Figs. 9 and 10) with a bell crank lever 72 journaled on a pin 73 carried by a bracket 74 secured to the upper face of table 28. Each mold section 61 is connected by a link 75 with a bell crank lever 76 journaled on the adjacent pin 73 beneath the bell crank lever 72 which is coordinated with the mold section 60 of the next adjacent mold M. Levers 72 and 76 carried by the same pin 73 are coordinated with mold sections 60 and 61 of adjacent molds M, instead of mold sections 60 and 61 of the same mold in order to avoid the production of right and left parts.

It is highly important that the mold sections 60 and 61 of any mold, when brought to closed and co-operating position, be very firmly held together in order to withstand the high pressures to which the mold is subjected at the press position and therefore, in order that the toggle formed by link 71 and lever 72 and by link 75 and lever 76 be readily adjustable, the connection between each link and its lever is accurately adjustable by means of the construction shown in Fig. 13 where a pin 77 journaled in lever 72 or 76 is provided with an eccentric portion 78 which is journaled in link 71 or 75 so that, by rotation of pin 77, the effective lengths of the toggle 71—72 or 75—76, may be accurately adjusted. Pin 77 is provided with a knurled head 79 by which it may be turned and is held in adjusted position by spring 80 and a retaining lug 81.

Each lever 72 is provided with a temper screw 82 (Figs. 9 and 10) acting against a stop 83 to limit the throw of the toggle in one direction and each lever 76 is similarly provided with a temper screw 84.

Each lever 72 is provided on one of its arms with a roller 85 (Figs. 9 and 11) and one arm of each lever 76 is provided with a roller 86, said rollers being provided for actuation by opening arms 87, 87 and closing arms 88, 88.

The arms 87 are carried by two vertical shafts 89 journaled on base 25 and operated by links 90, 90 on cross head 91 carried by a piston rod 92 of a pneumatic cylinder 93.

Sleeved over each shaft 89, and journaled in a bracket 94 (Fig. 12) is a sleeve shaft 95 to the upper end of which is secured a closing arm 88 and to the lower end of which is secured a lever 96 connected by link 97 with a cross head 98 carried by the piston rod 99 of a pneumatic cylinder 100, the arrangement being such that, when two mold sections in closed position are brought to the opening station, arms 87 sweeping outwardly from each other engage adjacent pins 85 and 86 to break toggles 71—72 and 75—76 and open the mold sections, and arms 88 thereafter sweeping toward each other engage said pins 85 and 86 to return the mold sections to closed position.

Figure 9:
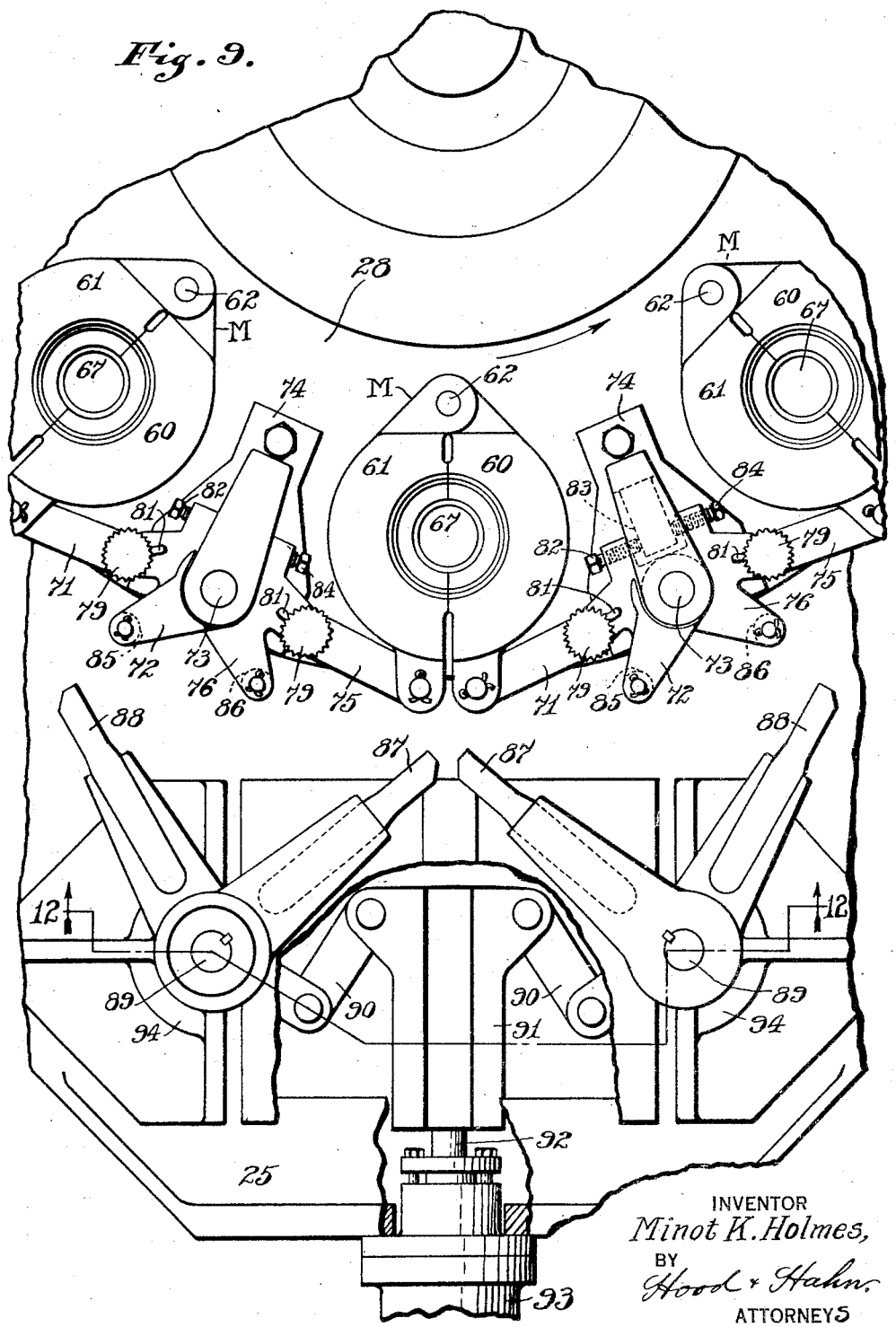
Fig. 9 is a fragmentary plan, on an enlarged scale, of a mold and mold operating mechanism with the mold in closed position.

Owing to extreme pressures to which the mold sections are subjected when in closed position it is desirable to provide means, in addition to the toggle mechanism shown in Fig. 9 to clamp the two mold sections together at the pressing station. For this purpose I have utilized a known clamping mechanism comprising a pair of beetle jaws (Fig. 4) or levers 101 pivoted upon a pin 102 and connected by toggle 103 with the piston rod 104 of a pneumatic cylinder 105 pivotally supported on a pin 106 from a base plate 107 on bracket 25, this particular arrangement being one commonly used in glass working machines and providing a structure which will co-operate with mold sections and compensate slight variations in positions at the pressing station. The details of this particular supplementary gripping mechanism form no part of my present invention.

A pin 44 forms an essential element in the pressing operation, said pin being provided with a threaded shank 44' which is embedded in the molten glass. Each pin becomes highly heated while embedded in the glass and must be unscrewed from the hardened glass and cooled before re-use. It is necessary therefore to provide means for unscrewing the pins from successively presented molds; means to transfer said pins successively from the extracting position to the press plunger, and, intermediately, means in which the pins may become sufficiently cool for re-use. For this purpose I provide mechanism more particularly shown in Figs. 3 to 8 and 14 to 22 inclusive.

Referring first to the unscrewing mechanism illustrated particularly in Figs. 3, 4 and 19 to 22 inclusive. When each mold reaches position X (Fig. 6) conveniently positioned immediately preceding the discharge position Y, the glass has chilled to such a point that the pin 44 may be extracted and at this time the freshly set glass adheres somewhat to the threaded portion of the pin so that a very considerable initial resistance to turning is offered. A very considerable amount of power is therefore initially required to start turning the pin but as soon as turning has been started the pin may be very rapidly unscrewed with a very slight exertion of power.

Heretofore in machines of this kind the speed of the unscrewing mechanism was necessarily slow because the same mechanism serving to start the unscrewing action has been used to complete such action. In my present construction I have provided means by which the unscrewing action after the initial movement, is very highly speeded up.

Referring particularly to Figs. 19 to 22. The shank 43 of pin 44 is diametrically axially notched at 110 so as to receive swinging fingers 111 pivoted at 112 in slots 113 in a cylindrical sleeve 114 within which is mounted a plunger 115 having a spring plunger 116 mounted therein at its lower end, said plunger being backed by spring 117 and provided in its lower end with a pocket 118 adapted to fit over the upper coned end of shank 43. Sleeved over cylinder 114 is a shell 119 normally held in the position shown in Figs. 19 and 21 by a spring 120 said shell, in this position, restraining fingers 111 from outward swing away from engagement with the shank 43 of pin 44. A pin 121 carried by shell 119 projects through slots 122 and 123 in cylinder 114 and plunger 115 respectively. Cylinder 114 is attached by screws 124 to a shaft 125 journaled in a shell 126 carried by a cross head 127, said shaft also carrying an externally threaded shell 128 extending down over shell 119 and threaded into a member 129 mounted in shell 126, the member 129 being internally threaded to receive the threads of shell 128. The threads of members 128 and 129, though shown as quite fine, are in fact of the same lead as the threads 44' on pin 44.

Shaft 125 carries a pinion 130 meshing with a gear 131 splined upon a shaft 132 (Fig. 4) provided with a pinion 133 meshing with the main gear 134 of a differential gearing 135 the elements of which are connected to two aligned shafts 136 and 137.

Shaft 136 carries at its outer end a large gear 138 and shaft 137 carries at its outer end a small gear 139. Gear 138 meshes with a rack 140 (Fig. 23) carried by the piston rod 141 of a pneumatic cylinder 142. Gear 139 meshes with a rack 143 carried by the piston rod 144 of a pneumatic cylinder 145. Cylinders 142 and 145 receive air pressure in opposite ends simultaneously and the action is as follows. The pistons in these cylinders being the same diameter and the air pressure being the same in each cylinder, the piston of cylinder 142, because of the large gear 138, comes into action first and, exerting great power upon gear 133, gives shaft 132 enough movement to give an initial turn, or part of a turn, to pin 44 whereupon the resistance of pin 44 having been substantially reduced piston rod 144 of cylinder 145 may come into action on the small gear 139 and thus drive shaft 132 very much more rapidly so as to rapidly unscrew pin 44 from its mold. The rotation of shaft 125, in the unscrewing direction, causes shell 128 to move upwardly in element 129 and, when the upper end of the movement is approached the upper end of plunger 115 comes into engagement with a vertically adjustable stop pin 150 (Fig. 4) thus restraining further upward movement of shell 120 and permitting fingers 111 to move upwardly within shell 120 to the position shown in Fig. 20, the spring plunger 116 acting upon pin 44 to eject it from the chuck and remaining as a chock between the ends of said fingers until the next descending action of the cross head 127. Cross head 127 is carried by a piston rod 151 of pneumatic cylinder 152.

For the purpose of transferring the pins 44 from the retracting plunger to the press plunger I provide the mechanism illustrated more particularly in Figs. 3 to 8 and 14 to 17 inclusive. Journaled in the main frame on a vertical axis is an oscillating member 161 provided with a radially projecting arm 162 having an open ended pin cup 163 (Figs. 8 and 15) said pin cup being provided with a bottom plate 164 normally held in closed position by a spring 165. Member 161 is oscillated in synchronism with cross head 127 by means of a roller 166 carried by the cross head and projected into a cam slot 167 in member 161.

Journaled on a vertical pin 170 (Figs. 14 and 15) is a series of radial pin-carrying fingers 171 which are interdigitated over pin 170 and each provided at its outer end with an open ended pin cup 172, each pin cup coming successively beneath a guide hole 173 in a top plate 174. The various pin arms 171 are frictionally held in a group forming a pin basket by a pressure plate 175 acted upon by a spring 176. Plate 174 carries a gravity latch 177 having a latch finger 178 adapted to project into a notch 179 in each pin pocket 172 so that the end of the latch may project into the bore of each pin pocket 172. Latch 177 is also provided with a portion 180 adapted to engage each pin arm as it reaches the pin receiving position and to retain said pin arm in such position until a pin has been dropped into its pin pocket.

The arrangement is such that cup 163, being brought into vertical alignment beneath the unscrewing plunger when said plunger has reached its highest position, will receive a pin 44 as it drops after release by fingers 111 and, upon the next down stroke of cross head 127 will be swung to the position shown in Fig. 15 in vertical alignment over a pin pocket 172, bottom plate 164 coming into engagement with a stop 181 (Fig. 8) so as to permit the pin to drop to the position shown in full lines in Fig. 15. As the pin drops to this position it engages finger 178 of latch 177 so as to withdraw portion 180 of said latch from the path of movement of the adjacent pin arm 171 and permit it to be forwarded. It will be noted at this point that there can be no forwarding movement of a pin arm 171 from the position Z (Fig. 14) except after, and as a result of, the delivery of a pin 44 thereto. The impact of the dropping pin is taken by a wear plate 182'.

The pockets 172 of the pin arms 171 sweep over a plate 182 which extends to station W (Fig. 14) where it is supplemented by a radially movable plate 183 (Fig. 15) which is withdrawn from beneath the pin pocket at the station W by a swinging arm 184 provided at its outer end with a pin pocket 185 which may be swung into engagement with roller 186 (Fig. 15) carried by the supplementing plate 183 so as to move it back out of alignment with the pin pocket against the action of spring 187.

Figure 7:
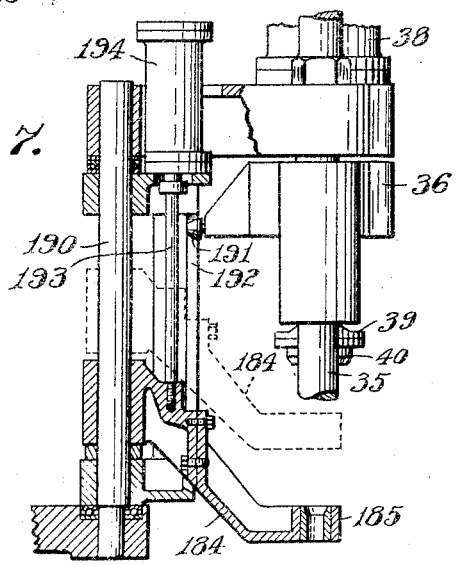
Fig. 7 is a fragmentary section on line 7—7 of Fig. 6.

Arm 184 is vertically reciprocable on a shaft 190 (Figs. 3 and 7) which is oscillated in synchronism with cross head 36 by means of a roller 191 carried by the cross head and engaging the cam slot 192. The arm 184 is vertically reciprocated, as indicated in Fig. 7, by a piston rod 193 of an air cylinder 194 carried by and oscillating with shaft 190.

Adjacent station W a gravity latch 195 is pivoted at 196 and is provided with a finger 197 which projects into the slots 179 of pockets 172 as these pockets move up to station W. If there is a pin 44 in the pocket at this time the shank 43 of said pin will engage the finger 197 of latch 195 and thus hold the arm against further forward movement at station W until the pin is released. Arm 184 is then swung to bring its pin pocket 185 into alignment beneath this pocket 172 at the same time engaging roller 186 and retracting plate 183 so that pin 44 may drop into pocket 185, a spring finger 199 on arm 184 engaging latch 195 and withdrawing it from the pin 44 so as to leave said pin free to drop. Arm 184 is then promptly swung toward the position shown in Fig. 6, the upper end of pin 44 in this movement passing out through a slot 200 in the side wall of pocket 172, and withdrawing finger 199 from latch 195 to permit it to resume its normal position to restrain the next pin-carrying arm, the preceding arm, from which a pin 44 has just dropped, passing on to station Z (Fig. 14). If for any reason pin 44 fails to drop into pocket 185 at station W the arm 171 at this station will be retained by catch 195 until the next swing of arm 184 or, if necessary, there is a manual extraction of the pin 44 at this station.

Any suitable means may be used to cause advancement of the basket arms 171, as they are frictionally associated and any driving force applied to one will be applied to all and those which are free to move may move.

In the present drawings the advancement of the basket arms is obtained in the following manner. Carried by the shaft 170 is ratchet head 201 adapted to be engaged by a ratchet 202 formed in the lower end of a sleeve 203 axially and angularly reciprocable on the upper end of shaft 170 and normally urged upwardly by a spring 204. Sleeve 203 is provided with a cam slot 205 engaged by a roller 206 carried by cross head 127, the arrangement being such that upward movement of the cross head lifts the ratchet 202 from ratchet 201 and swings sleeve 203 through a considerable angle and, on the downward stroke of cross head 127, seats the ratchet 202 in ratchet 201 and turns ratchet 201 through a corresponding angle.

The raising and lowering of sleeve 203 is facilitated by a friction block 208 (Fig. 5) carried by cross head 127.

It will be noted that no arm 171 may pass station W until it does not contain a pin 44 and may not pass station Z until it does contain a pin. The number of arms 171 may be varied to a considerable extent but the number should always be less than enough to supply a continuous circumferential series of pin pockets 172, as indicated in Fig. 14.

with a threaded shank 44' which is embedded in the molten glass. Each pin becomes highly heated while embedded in the glass and must be unscrewed from the hardened glass and cooled before re-use. It is necessary therefore to provide means for unscrewing the pins from successively presented molds; means to transfer said pins successively from the extracting position to the press plunger, and, intermediately, means in which the pins may become sufficiently cool for re-use. For this purpose I provide mechanism more particularly shown in Figs. 3 to 8 and 14 to 22 inclusive.

Referring first to the unscrewing mechanism illustrated particularly in Figs. 3, 4 and 19 to 22 inclusive. When each mold reaches position X (Fig. 6) conveniently positioned immediately preceding the discharge position Y, the glass has chilled to such a point that the pin 44 may be extracted and at this time the freshly set glass adheres somewhat to the threaded portion of the pin so that a very considerable initial resistance to turning is offered. A very considerable amount of power is therefore initially required to start turning the pin but as soon as turning has been started the pin may be very rapidly unscrewed with a very slight exertion of power.

Heretofore in machines of this kind the speed of the unscrewing mechanism was necessarily slow because the same mechanism serving to start the unscrewing action has been used to complete such action. In my present construction I have provided means by which the unscrewing action after the initial movement, is very highly speeded up.

Referring particularly to Figs. 19 to 22. The shank 43 of pin 44 is diametrically axially notched at 110 so as to receive swinging fingers 111 pivoted at 112 in slots 113 in a cylindrical sleeve 114 within which is mounted a plunger 115 having a spring plunger 116 mounted therein at its lower end, said plunger being backed by spring 117 and provided in its lower end with a pocket 118 adapted to fit over the upper coned end of shank 43. Sleeved over cylinder 114 is a shell 119 normally held in the position shown in Figs. 19 and 21 by a spring 120 said shell, in this position, restraining fingers 111 from outward swing away from engagement with the shank 43 of pin 44. A pin 121 carried by shell 119 projects through slots 122 and 123 in cylinder 114 and plunger 115 respectively. Cylinder 114 is attached by screws 124 to a shaft 125 journaled in a shell 126 carried by a cross head 127, said shaft also carrying an externally threaded shell 128 extending down over shell 119 and threaded into a member 129 mounted in shell 126, the member 129 being internally threaded to receive the threads of shell 128. The threads of members 128 and 129, though shown as quite fine, are in fact of the same lead as the threads 44' on pin 44.

Shaft 125 carries a pinion 130 meshing with a gear 131 splined upon a shaft 132 (Fig. 4) provided with a pinion 133 meshing with the main gear 134 of a differential gearing 135 the elements of which are connected to two aligned shafts 136 and 137.

Shaft 136 carries at its outer end a large gear 138 and shaft 137 carries at its outer end a small gear 139. Gear 138 meshes with a rack 140 (Fig. 23) carried by the piston rod 141 of a pneumatic cylinder 142. Gear 139 meshes with a rack 143 carried by the piston rod 144 of a pneumatic cylinder 145. Cylinders 142 and 145 receive air pressure in opposite ends simultaneously and the action is as follows. The pistons in these cylinders being the same diameter and the air pressure being the same in each cylinder, the piston of cylinder 142, because of the large gear 138, comes into action first and, exerting great power upon gear 133, gives shaft 132 enough movement to give an initial turn, or part of a turn, to pin 44 whereupon the resistance of pin 44 having been substantially reduced piston rod 144 of cylinder 145 may come into action on the small gear 139 and thus drive shaft 132 very much more rapidly so as to rapidly unscrew pin 44 from its mold. The rotation of shaft 125, in the unscrewing direction, causes shell 128 to move upwardly in element 129 and, when the upper end of the movement is approached the upper end of plunger 115 comes into engagement with a vertically adjustable stop pin 150 (Fig. 4) thus restraining further upward movement of shell 120 and permitting fingers 111 to move upwardly within shell 120 to the position shown in Fig. 20, the spring plunger 116 acting upon pin 44 to eject it from the chuck and remaining as a chock between the ends of said fingers until the next descending action of the cross head 127. Cross head 127 is carried by a piston rod 151 of pneumatic cylinder 152.

For the purpose of transferring the pins 44 from the retracting plunger to the press plunger I provide the mechanism illustrated more particularly in Figs. 3 to 8 and 14 to 17 inclusive. Journaled in the main frame on a vertical axis is an oscillating member 161 provided with a radially projecting arm 162 having an open ended pin cup 163 (Figs. 8 and 15) said pin cup being provided with a bottom plate 164 normally held in closed position by a spring 165. Member 161 is oscillated in synchronism with cross head 127 by means of a roller 166 carried by the cross head and projected into a cam slot 167 in member 161.

Journaled on a vertical pin 170 (Figs. 14 and 15) is a series of radial pin-carrying fingers 171 which are interdigitated over pin 170 and each provided at its outer end with an open ended pin cup 172, each pin cup coming successively beneath a guide hole 173 in a top plate 174. The various pin arms 171 are frictionally held in a group forming a pin basket by a pressure plate 175 acted upon by a spring 176. Plate 174 carries a gravity latch 177 having a latch finger 178 adapted to project into a notch 179 in each pin pocket 172 so that the end of the latch may project into the bore of each pin pocket 172. Latch 177 is also provided with a portion 180 adapted to engage each pin arm as it reaches the pin receiving position and to retain said pin arm in such position until a pin has been dropped into its pin pocket.

The arrangement is such that cup 163, being brought into vertical alignment beneath the unscrewing plunger when said plunger has reached its highest position, will receive a pin 44 as it drops after release by fingers 111 and, upon the next down stroke of cross head 127 will be swung to the position shown in Fig. 15 in vertical alignment over a pin pocket 172, bottom plate 164 coming into engagement with a stop 181 (Fig. 8) so as to permit the pin to drop to the position shown in full lines in Fig. 15. As the pin drops to this position it engages finger 178 of latch 177 so as to withdraw portion 180 of said latch from the path of movement of the adjacent pin arm 171 and permit it to be forwarded. It will be noted at this point that there can be no forwarding movement of a pin arm 171 from the position Z (Fig. 14) except after, and as a result of, the delivery of a pin 44 thereto. The impact of the dropping pin is taken by a wear plate 182'.

The pockets 172 of the pin arms 171 sweep over a plate 182 which extends to station W (Fig. 14) where it is supplemented by a radially movable plate 183 (Fig. 15) which is withdrawn from beneath the pin pocket at the station W by a swinging arm 184 provided at its outer end with a pin pocket 185 which may be swung into engagement with roller 186 (Fig. 15) carried by the supplementing plate 183 so as to move it back out of alignment with the pin pocket against the action of spring 187.

Arm 184 is vertically reciprocable on a shaft 190 (Figs. 3 and 7) which is oscillated in synchronism with cross head 36 by means of a roller 191 carried by the cross head and engaging the cam slot 192. The arm 184 is vertically reciprocated, as indicated in Fig. 7, by a piston rod 193 of an air cylinder 194 carried by and oscillating with shaft 190.

Adjacent station W a gravity latch 195 is pivoted at 196 and is provided with a finger 197 which projects into the slots 179 of pockets 172 as these pockets move up to station W. If there is a pin 44 in the pocket at this time the shank 43 of said pin will engage the finger 197 of latch 195 and thus hold the arm against further forward movement at station W until the pin is released. Arm 184 is then swung to bring its pin pocket 185 into alignment beneath this pocket 172 at the same time engaging roller 186 and retracting plate 183 so that pin 44 may drop into pocket 185, a spring finger 199 on arm 184 engaging latch 195 and withdrawing it from the pin 44 so as to leave said pin free to drop. Arm 184 is then promptly swung toward the position shown in Fig. 6, the upper end of pin 44 in this movement passing out through a slot 200 in the side wall of pocket 172, and withdrawing finger 199 from latch 195 to permit it to resume its normal position to restrain the next pin-carrying arm, the preceding arm, from which a pin 44 has just dropped, passing on to station Z (Fig. 14). If for any reason pin 44 fails to drop into pocket 185 at station W the arm 171 at this station will be retained by catch 195 until the next swing of arm 184 or, if necessary, there is a manual extraction of the pin 44 at this station.

Any suitable means may be used to cause advancement of the basket arms 171, as they are frictionally associated and any driving force applied to one will be applied to all and those which are free to move may move.

In the present drawings the advancement of the basket arms is obtained in the following manner. Carried by the shaft 170 is ratchet head 201 adapted to be engaged by a ratchet 202 formed in the lower end of a sleeve 203 axially and angularly reciprocable on the upper end of shaft 170 and normally urged upwardly by a spring 204. Sleeve 203 is provided with a cam slot 205 engaged by a roller 206 carried by cross head 127, the arrangement being such that upward movement of the cross head lifts the ratchet 202 from ratchet 201 and swings sleeve 203 through a considerable angle and, on the downward stroke of cross head 127, seats the ratchet 202 in ratchet 201 and turns ratchet 201 through a corresponding angle.

The raising and lowering of sleeve 203 is facilitated by a friction block 208 (Fig. 5) carried by cross head 127.

It will be noted that no arm 171 may pass station W until it does not contain a pin 44 and may not pass station Z until it does contain a pin. The number of arms 171 may be varied to a considerable extent but the number should always be less than enough to supply a continuous circumferential series of pin pockets 172, as indicated in Fig. 14.

Figure 4:
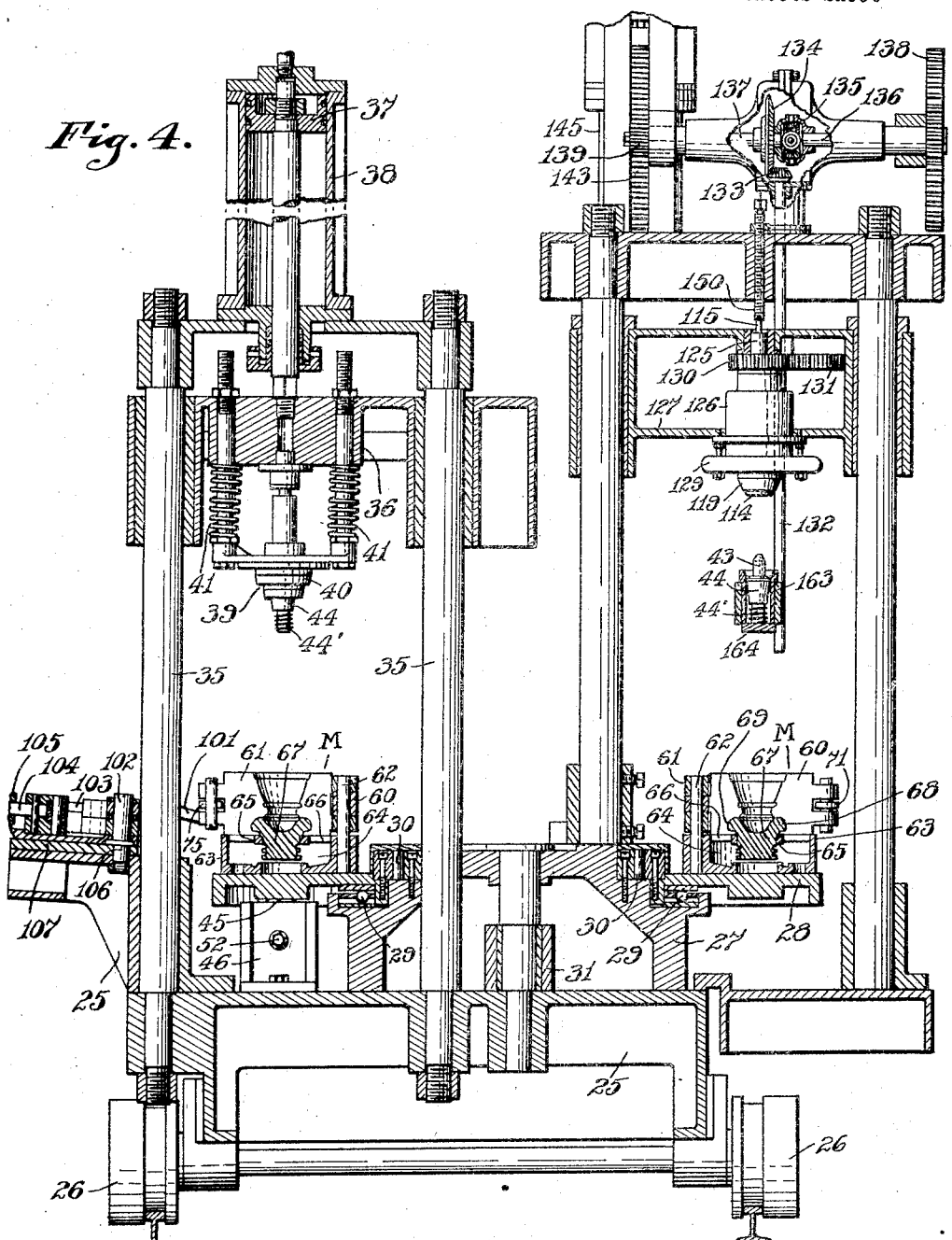
Fig. 4 is a section on line 4—4 of Fig. 2.
Figure 5:
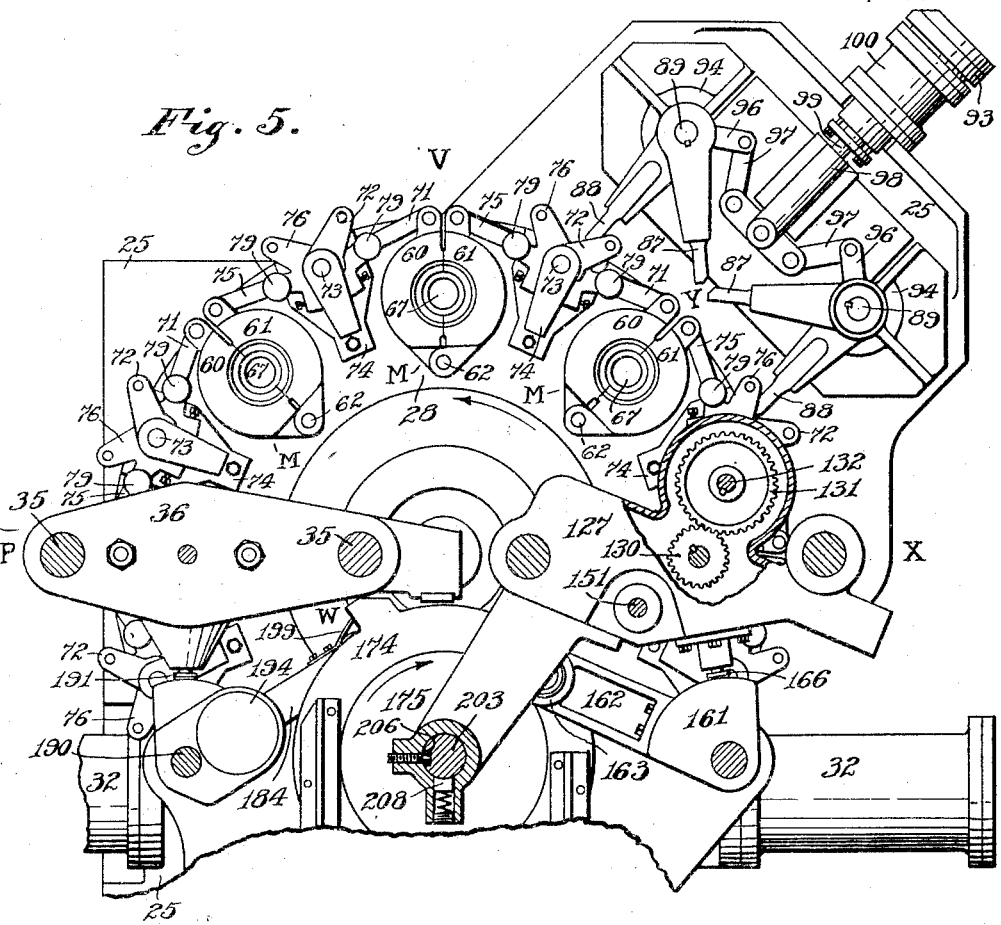
Fig. 5 is a horizontal section on line 5—5 of Fig. 3.
Figure 6:
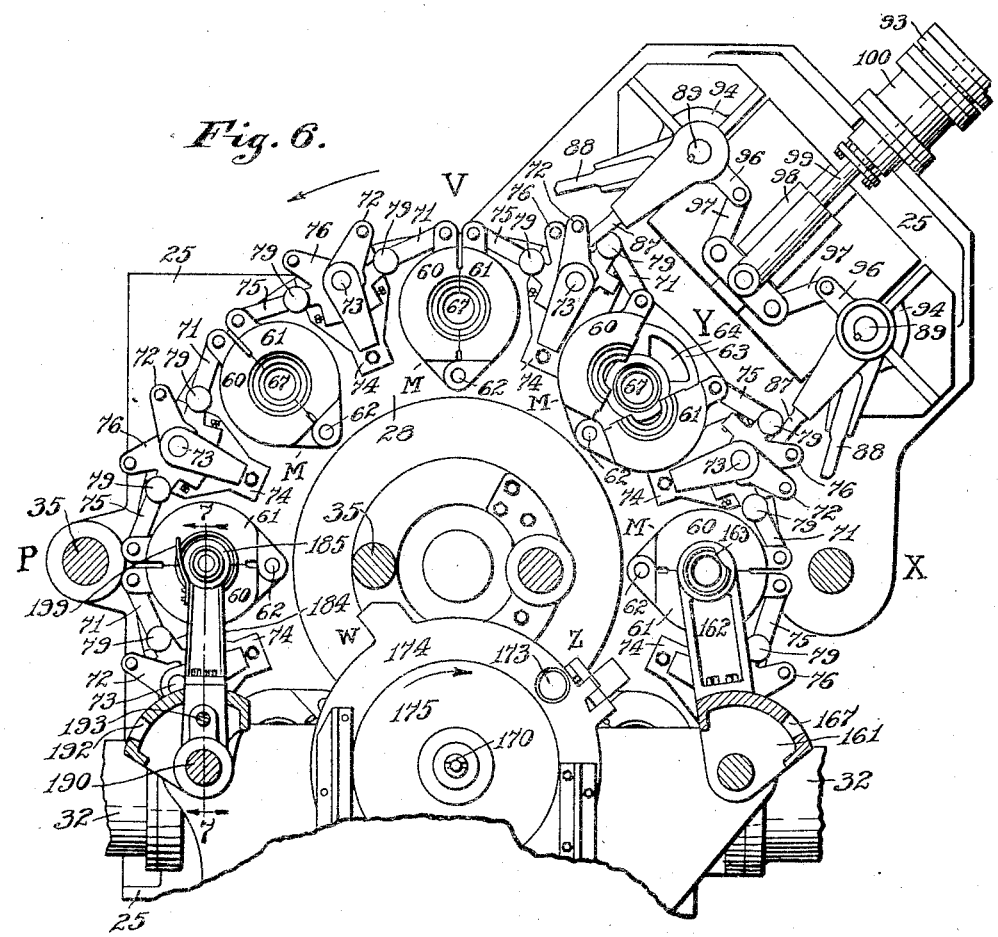
Fig. 6 is a horizontal section on line 6—6 of Fig. 3.
Figure 8:
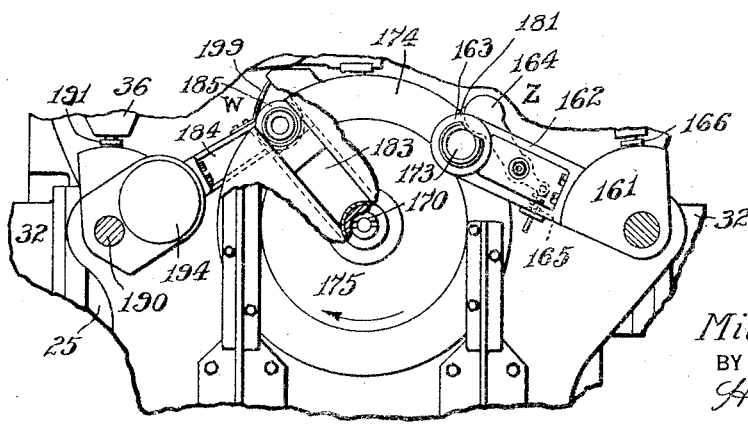
Fig. 8 is a fragmentary horizontal section approximately on the plane of Fig. 5.

Any suitable timing mechanism for coordinating and synchronizing the movements of the various parts may be provided. There are many such mechanisms on the market and in Fig. 24 I indicate diagrammatically the various valves and valve manipulating means by which, the table having come to rest, the various parts are caused to automatically go through their operating cycles briefly as follows: Glass having been deposited in a mold at station V (Fig. 6) said mold comes ultimately to the press position P (Fig. 6). Arm 184 has been moved upwardly to the position shown in dotted lines in Fig. 7, and has delivered a pin to the press chuck (Fig. 4). If the machine is being supplied by glass automatically the supply device (not shown) at the completion of a glass delivery operation, will supply air to cylinder 38 and the press plunger will start down, swinging arm 184 to the position shown in Fig. 15, and driving a pin 44 into the molten glass. The press plunger then rises leaving pin 44 in the molten glass. As the press plunger descends air is supplied to cylinder 51 so that anvil 45 is raised to table supporting position and air is also supplied to cylinder 105 so that clamp 101 engages the mold in which the pressing action is to take place. After the pressing action is completed the table is advanced step by step until the mold in question reaches station X. At this station the unscrewing chuck is moved down to engage the pin embedded in the now chilled glass and, by the operation already described, this pin is withdrawn, transferred to arm 162 and by it transferred to one of the arms 171 ultimately being transferred from this arm to arm 184, cooling in the meantime.

I claim as my invention:

1. In a glass working machine utilizing a pressing pin to be extracted from the finished article, means for presenting a series of molds successively to successive stations, a press plunger, an extracting plunger, a transfer basket formed to receive a circumferential series of press pins, a transfer arm arranged to receive pins from the extracting plunger and deliver the same to the transfer basket, a transfer arm arranged to receive pins from the transfer basket and deliver the same to the press plunger.

2. In a glass working machine utilizing a pressing pin to be extracted from the finished article, a pin transfer basket comprising a plurality of relatively movable pin receiving members forming an endless series, means for driving said members through their cycle, and means for restraining said pin receiving members against movement.

3. In a glass working machine utilizing a pressing pin to be extracted from the finished article, a pin transfer basket comprising a plurality of relatively movable pin receiving members forming an endless series, means for driving said members through their cycle, and pin controlled means for restraining said pin receiving members against movement.

4. In a glass working machine utilizing a pressing pin to be extracted from the finished article, a pin transfer basket comprising a plurality of relatively movable pin receiving members forming an endless series, means for driving said members through their cycle, means for restraining said pin receiving members against movement, means for delivering pins to successive pin receiving elements, and means for extracting pins from successive pin receiving elements.

5. In a glass working machine utilizing a pressing pin to be extracted from the finished article, a pin transfer basket comprising a plurality of relatively movable pin receiving members forming an endless series, means for driving said members through their cycle, pin controlled means for restraining said pin receiving members against movement, means for delivering pins to successive pin receiving elements, and means for extracting pins from successive pin receiving elements.

6. In a glass working machine utilizing a pressing pin to be extracted from the finished article, a pin transfer basket comprising an endless series of independently movable pin receiving members, a latch arranged to co-operate with each of said members to restrain it against movement in the absence of a pin, a second latch arranged to cooperate successively with said pin receiving members to restrain them from movement in the presence of a pin, means for normally retaining a pin within each pocket adjacent said last mentioned latch, a transfer arm movable into and out of alignment with the pin receiving member at the last mentioned point, and means coordinated with said arm for cooperating with said last mentioned catch to release a pin.

7. In a glass working machine utilizing a pressing pin to be extracted from the finished article, a transfer basket comprising a plurality of nested radiating arms each provided with a pin receiving pocket and each movable independently relative to adjacent arms, means for retaining pins in said pockets during a portion of the movement of said pockets, a latch arranged adjacent the path of travel of said pockets and provided with means for engaging each arm to restrain it against advancing movement and also provided with a portion projectable into the pin pocket and engageable by a pin to drive it out of arm restraining position, a second latch arranged in the path of movement of said arms and provided with a portion projectable into the pin pockets and engageable by a pin, means for applying an advancing force to said arms, means at a discharge station for holding a pin in its pocket, means by which said holding means may be retracted, a transfer member movable into and out of position to receive a pin from an arm at the discharge station, and means coordinated with said last mentioned means for controlling the last mentioned latch.

8. In a glass working machine utilizing a pressing pin to be extracted from the finished article, a pin extracting plunger comprising a rotatable chuck movable axially of the pin and capable of engaging a pin for rotative and axial movement, and means for rotating and axially moving said chuck, said means comprising three shafts differentially geared together, one of said shafts being connected to the chuck and the other two shafts being connected each to a motor member, the leverage of the two motor members upon their respective shafts being different.

9. In a glass working machine utilizing a pressing pin to be extracted from the finished article, a mold, a pin extracting plunger cooperating with said mold and comprising a rotatable chuck permitting axial movement of the pin relative to the mold and capable of engaging a pin for rotative movement relative to the mold, and means for rotating said chuck, said means comprising three shafts differentially geared together, one of said shafts being connected to the chuck and the other two shafts being connected each to a motor member, the leverage of the two motor members on their respective shafts being different.

10. In a glass working machine utilizing a pressing pin to be extracted from the finished article, a pin extracting chuck comprising a threaded support, a second member threaded in said support, a pin engaging catch carried by said member, a shell carried by said member and engaging said catch, said shell being movable relative to the adjacent member, means for rotating the aforesaid member in its support and means for causing relative movement between said member and the shell to release or retain the pin engaging catch relative to the pin.

11. In a glass working machine utilizing a pressing pin to be extracted from the finished article, a pin extracting chuck comprising a threaded support, a second member threaded in said support, a pin engaging catch carried by said member, a shell carried by said member and engaging said catch, said shell being movable relative to the adjacent member, means for rotating the adjacent member in its support, means for causing relative movement between said member and the shell to release or retain the pin engaging catch relative to the pin, and a pin ejecting member operating to eject the pin from the chuck when the catch is released.

12. In a glass working machine utilizing a pressing pin to be extracted from the finished article, a pin extracting chuck comprising a threaded support, a second member threaded in said support, a pin engaging catch carried by said member, a shell carried by said member and engaging said catch, said shell being movable relative to the adjacent member, means for rotating the adjacent member in its support, means for causing relative movement between said member and the shell to release or retain the pin engaging catch relative to the pin, a pin ejecting member operating to eject the pin from the chuck when the catch is released, and to chock said catch against return movement until the pin ejecting member is pin retracted.

13. In a glass working machine a mold comprising a pair of mating mold members, two separate operating members by which each of said mold members may be moved to and from closed position, means for simultaneously operating upon said operating members to shift the mold members to closed position, and other means for simultaneously acting upon said operating members to shift said mold members to open position.

14. In a glass working machine a mold table, a plurality of molds mounted on said mold table, each of said molds comprising two independently movable mold members, and two operating and locking means each associated with one of the mold members, and means, operable while the mold table is stationary, for successively simultaneously operating the mold-operating-and-locking means of each mold.

15. In a glass working machine a mold table, a plurality of molds mounted on said mold table, each of said molds comprising two independently movable mold members, and two operating and locking means each associated with one of the mold members, each of said operating and locking members comprising a toggle, and means, operable while the mold table is stationary, for successively simultaneously operating the mold-operating-and-locking means of each mold.

16. In a glass working machine a mold table, a plurality of molds mounted on said mold table, each of said molds comprising two independently movable mold members, and two operating and locking means each associated with one of the mold members, each of said operating and locking members comprising a toggle the knuckle of which is a rotatable pin journaled in one element of the toggle and having an eccentric portion journaled in the other element of the toggle.

17. In a glass working machine a rotary mold table, a plurality of molds mounted thereon and each comprising two independently movable mold members, a series of pins carried by the table between each adjacent two molds, a lever journaled on each pin and acting on a mold member of one mold, a second lever journaled on said pin and acting on one member of another mold.

18. In a glass working machine a rotary mold table, a plurality of molds mounted thereon and each comprising two independently movable mold members, a series of pins carried by the table between each adjacent two molds, a lever journaled on each pin and acting on a mold member of one mold, a second lever journaled on said pin and acting on one member of another mold, means for acting on the operating levers of the mold members of each mold successively to open said mold members, and means acting upon said operating members of each mold to close said mold members.

19. In a glass working machine a rotary mold table, a plurality of molds mounted thereon and each comprising two independently movable mold members, a series of pins carried by the table between each adjacent two molds, two series of toggles one element of each of which is journaled on each pin and the other element of each of which is connected to an adjacent mold section.

20. In a glass working machine a rotary mold table, a plurality of molds mounted thereon and each comprising two independently movable mold members, a series of pins carried by the table between each adjacent two molds, two series of toggles one element of each of which is journaled on each pin and the other element of each of which is connected to an adjacent mold section, means for acting on said toggles to close the molds, and other means acting on said toggles to open the molds.

In witness whereof I, MINOT K. HOLMES have hereunto set my hand at Indianapolis, Indiana, this 28th day of November, A. D. one thousand nine hundred and twenty-four.

MINOT K. HOLMES.